US006546360B1

United States Patent
Gilbert et al.

(10) Patent No.: US 6,546,360 B1
(45) Date of Patent: Apr. 8, 2003

(54) DEVICE SERVICING SYSTEM AND METHOD

(75) Inventors: Charles Gilbert, Sunnyvale, CA (US); Brian Westfall, Modesto, CA (US)

(73) Assignee: Trimble Navigation Limited, Sunnyvale, CA (US)

( * ) Notice: Subject to any disclaimer, the term of this patent is extended or adjusted under 35 U.S.C. 154(b) by 0 days.

(21) Appl. No.: 09/183,614

(22) Filed: Oct. 30, 1998

(51) Int. Cl.$^7$ .......................... G06F 11/00; G06F 15/00
(52) U.S. Cl. ........................................ 702/188; 702/150
(58) Field of Search ............................... 702/59, 61–63, 702/94, 122, 150–152, 184, 185, 188; 701/213; 705/22, 23; 340/457.4, 612, 613, 614

(56) References Cited

U.S. PATENT DOCUMENTS

| | | | | |
|---|---|---|---|---|
| 3,614,727 A | * | 10/1971 | Fritts | 340/905 |
| 3,886,590 A | * | 5/1975 | Walker et al. | 360/12 |
| 4,713,767 A | * | 12/1987 | Sato et al. | 701/220 |
| 4,987,776 A | * | 1/1991 | Koon | 73/340 C |
| 5,040,240 A | * | 8/1991 | Keegan | 455/260 |
| 5,055,823 A | * | 10/1991 | Fuller | 340/426 |
| 5,173,866 A | * | 12/1992 | Neumann et al. | 702/188 |
| 5,265,032 A | * | 11/1993 | Patel | 702/188 |
| 5,371,692 A | * | 12/1994 | Draeger et al. | 702/122 |
| 5,430,656 A | * | 7/1995 | Dekel et al. | 701/213 |
| 5,504,491 A | * | 4/1996 | Chapman | 342/357.09 |
| 5,504,591 A | * | 4/1996 | Chapman | 342/357.09 |
| 5,729,214 A | * | 3/1998 | Moore | 340/525 |
| 6,031,487 A | * | 2/2000 | Mickelson | 342/357.12 |
| 6,317,058 B1 | * | 11/2001 | Lemelson et al. | 340/905 |
| 2002/0008637 A1 | * | 5/2001 | Lemelson et al. | 340/907 |

FOREIGN PATENT DOCUMENTS

| CA | 2050176 A1 | * | 3/1993 |
|---|---|---|---|
| CA | 2050176 A | * | 3/1993 |

* cited by examiner

Primary Examiner—Marc S. Hoff
Assistant Examiner—Manuel L. Barbee
(74) Attorney, Agent, or Firm—Blakely, Sokoloff, Taylor & Zafman LLP

(57) ABSTRACT

A system and method for determining when portable devices require service. In one embodiment, the system is co-located with the portable device and includes a sensor, positioning system receiver and communication transmitter. The sensor senses when the portable device requires service. The positioning system receiver receives positioning signals, such as positioning signals issued by the Global Positioning System, (GPS), and uses the positioning system signals to determine the location of the portable device. The communications transmitter transmits a service signal to a service base station to indicate that the portable device requires service. The service signal includes the determined location of the portable device, thereby eliminating the need for service personnel to physically inspect every portable device in order to determine if any portable devices require service.

4 Claims, 7 Drawing Sheets

DEVICE SERVICING SYSTEM AND METHOD

BACKGROUND OF THE INVENTION

1. Field of the Invention

The present invention relates to a device servicing system for tracking servicing of portable devices.

2. Art Background

A wide variety of portable devices are in use today. Examples include portable lavatories, garbage dumpsters, portable water or fuel tanks, and vending machines, and road construction and warning signs. These devices are typically temporary but not permanently used at a particular location. One problem that exists when servicing these portable devices is knowing when the devices need to be serviced and where it is located. As usage plays a significant role in determining when service is needed, it is difficult for the servicing personnel to know when the devices need to be serviced. Typically, devices are serviced on a time periodic basis. Periodically, for example, once a week, the servicing personnel drive a predetermined route to physically check each device to determine whether or not it needs to be serviced. This is a very time consuming and costly process.

SUMMARY OF THE INVENTION

The system and method of the present invention tracks servicing of or positioning of portable devices which may be located in a plurality of locations. In one embodiment, a sensor is co-located with each portable device. The sensor monitors the portable device usage and issues a signal when the portable device requires service. For example, if the portable device is a portable water tank, the sensor will indicate when the tank is approximately empty. If the portable device is a road or warning sign, the sensor might indicate when unsafe road conditions are present. A device positioning system receiver is also co-located with each portable device to determine the location of the portable device. A communications transmitter transmits a service signal to indicate that the portable device requires service. This service signal includes the determined location of the portable device such that the servicing personnel will know exactly which device require service. Thus, the requirement to continuously go to the location of each device and physically determine whether it requires service is eliminated. In an alternate embodiment, the construction or warning sign would report its location upon command, enabling safety messages to be sent to the sign.

BRIEF DESCRIPTION OF THE DRAWINGS

The objects, features and advantages of the present invention will be apparent from the following detailed description in which.

DETAILED DESCRIPTION

The device servicing system of the present invention provides a time saving and cost saving system for servicing portable devices that are typically temporarily used at particular locations. In the following description for purposes of explanation, numerous details are set forth in order to provide a thorough understanding of the present invention. However, it will be apparent to one skilled in the art that these specific details are not required in order to practice the present invention. In other instances, well known electrical structures and circuits are shown in block diagram form in order not to obscure the present invention unnecessarily.

Figure 1A:
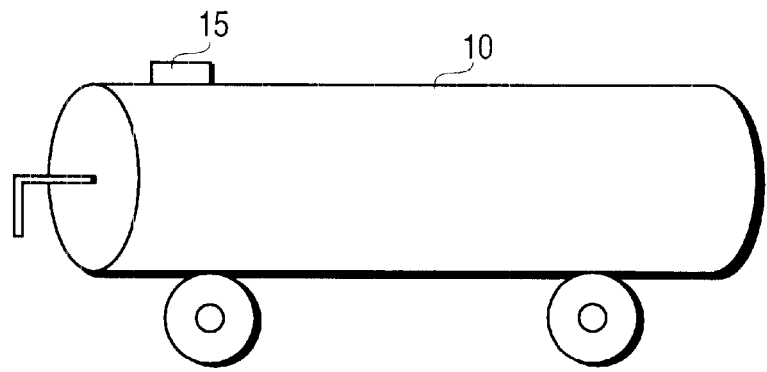
FIG. 1a, FIG. 1b and FIG. 1c illustrate portable devices employing the system and method of the present invention.
Figure 1B:
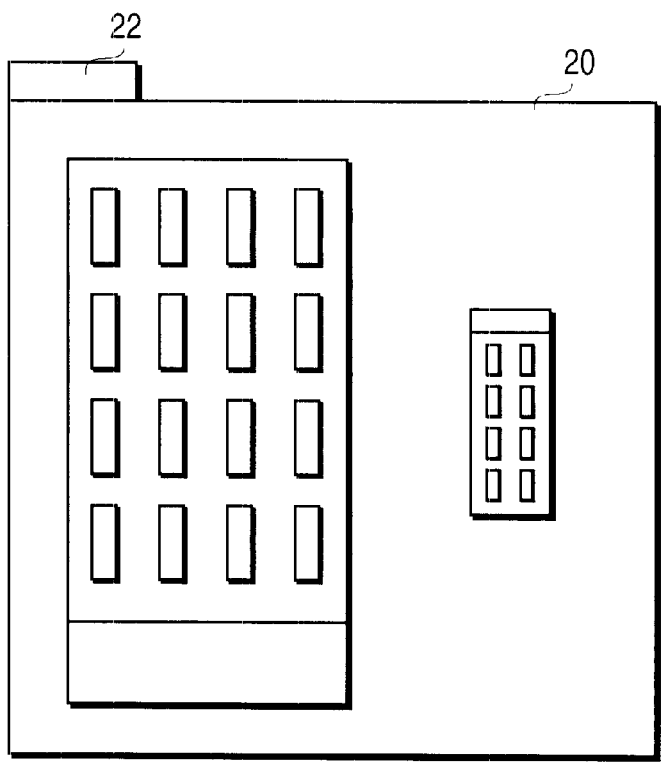

The device servicing system of the present invention tracks the servicing of portable devices such as those illustrated in FIGS. 1a and 1b. For example, as shown in FIG. 1a, a water tank 10, such as a tank that may be located on a construction site, requires service to refill the tank 10 when the tank is almost empty. Using the system of the present invention 15, a sensor senses when the tank requires service. A positioning system receiver, such as a global positioning system (GPS) receiver, is used to determine the location of the portable tank. A communications device, such as a radio transmitter, transmits the determined location of the tank 10 when the sensor determines servicing is required. Thus, when the water tank 10 is in need of a refill of water, the servicing system 15 sends a signal to the service base station identifying its location such that servicing personnel can be sent to the location identified in the service signal sent. Depending upon the type of device, the sensor senses when a device is approximately full, and senses when the device is approximately empty. Furthermore, it is contemplated that a plurality of sensors may be provided to sense a plurality of conditions of the portable device to indicate service is required.

Devices can include a variety of apparatus, including portable lavatories, portable water or fuel tanks, or vending machines, such as the one illustrated in FIG. 1b. FIG. 1b shows a food vending machine 20 with a portable device servicing system 22 located on the vending machine 20. Its readily apparent that the system 22 or portions of the system 22, for example the sensor, may be located in the interior of the portable device.

Figure 1C:
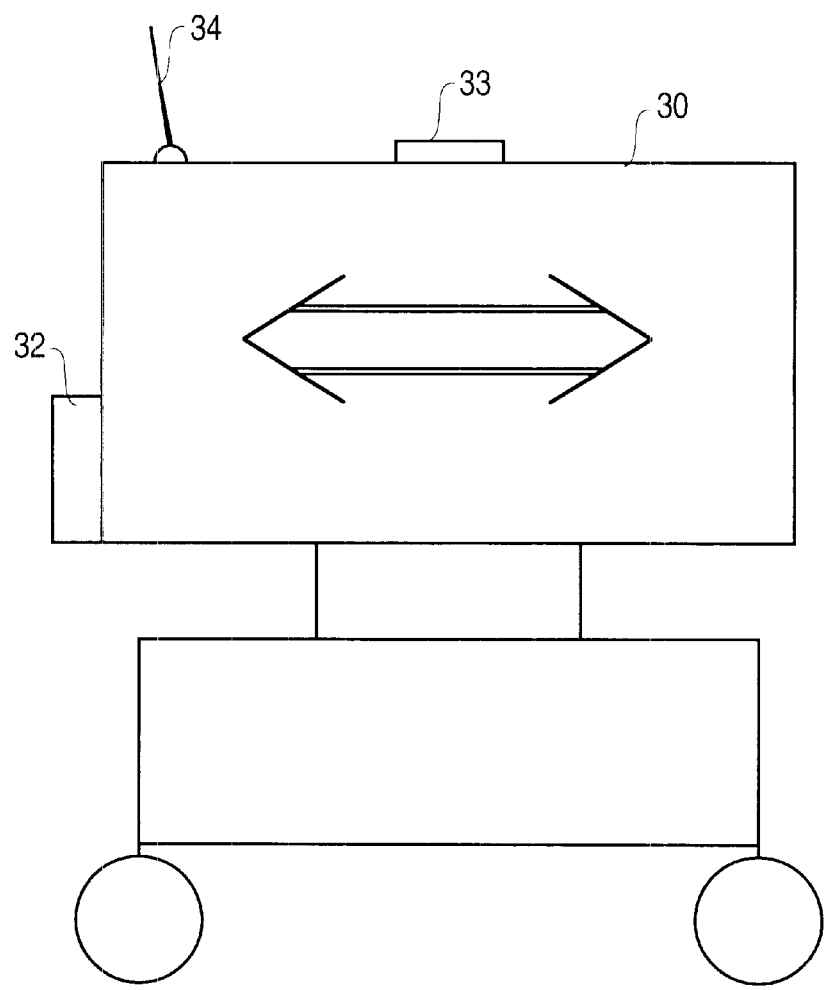

Alternately, the portable device may be a road construction or warning sign, such as illustrated in FIGS. 1c. The sign 30 typically is used until certain road work is complete or the road is safe to use. In one embodiment, the sign includes communications equipment 34 for communicating with a service base station and GPS receiver 33. Optionally, a sensor 32 is included.

Figure 2A:
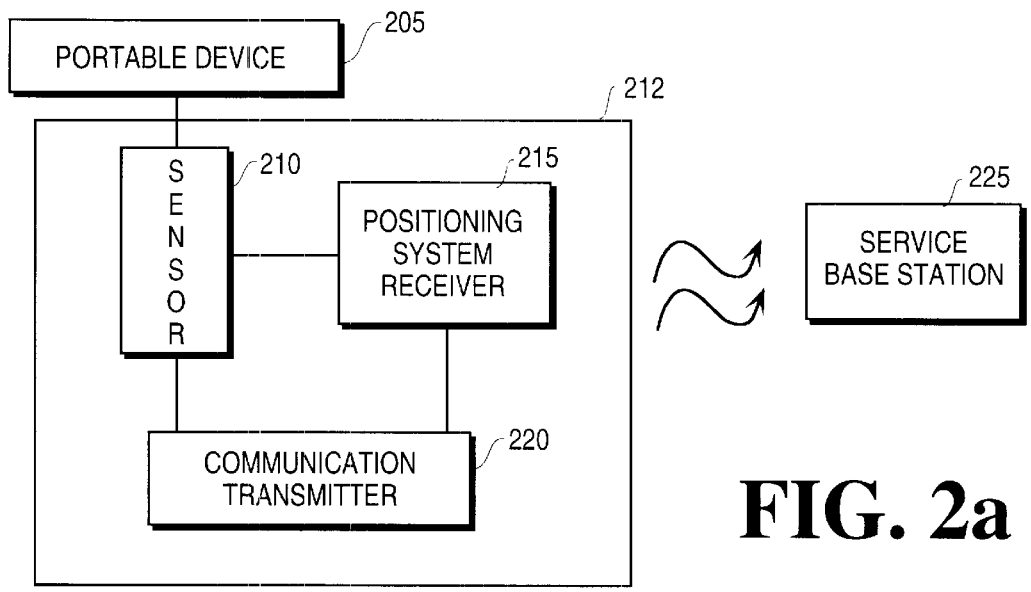
FIGS. 2a, FIG. 2b, and FIGS. 2c and 2d are simplified block diagrams of embodiments of the system and method of the present invention.

An overview of the system co-located with a portable device is illustrated in FIG. 2a. In the present embodiment, attached to the portable device 205 is system 212 which includes sensor 210. The sensor 210 is configured to operate in accordance with the type of device. Thus, for example, if the system 212 is co-located on a portable lavatory, the sensor will sense when the portable lavatory is approximately full and therefore requires service. In other embodiments, the sensor 210 will determine when a portable device 205, for example a water tank, is approximately empty and therefore requires service. Alternately, the sensor will be a switch, typically manually operated which indicates that the device, e.g., road construction sign, is no longer needed at the construction site.

A positioning system receiver 215 is coupled to the sensor 210 to determine the location of the portable device 205. A communication transmitter 220 is also included to transmit the position determined to a service base station 225 to notify servicing personnel that particular portable device 205 requires service. The positioning system receiver 215 is preferably a global positioning system (GPS) receiver that receives positioning signals from satellites and uses the positioning signals to determine the location of the portable device 205. The type of receiver 215 can vary and can be compatible with other types of positioning systems that provide positioning signals to the receiver 215 to determine location, such as LORAN-C, GLONASS and pseudo-lite positioning systems.

The communications transmitter can be embodied as a variety of transmitters, such as a radio transmitter, known to those skilled in the art that enables transmission of a signal, that includes information regarding location of the portable device 205, to a remote location 225. Furthermore, it should be readily apparent that the present block diagram is functional in nature and can be embodied in a variety of devices. For example, a number of functions may be performed by a central processing unit with associated circuitry to provide the functionality discussed above.

Figure 2B:
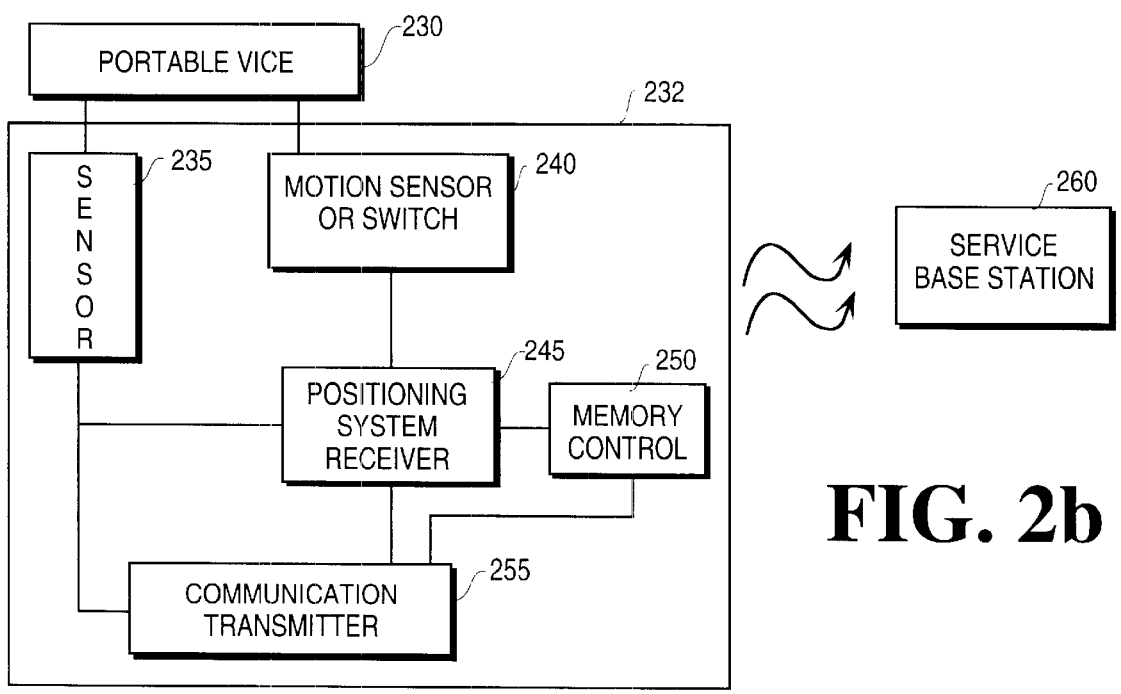

An alternate embodiment is shown in FIG. 2b. A portable device 230 includes a device 232 that has a sensor 235 and a motion sensor or switch 240. The motion sensor 240 senses when the portable device is moved. A variety of known motion sensors may be used. When the motion sensor 240 detects that the device 230 is moved, a moved signal is sent to the positioning system receiver 245 to determine the new location of the device 230. In one embodiment, the positioning system receiver 245 is maintained in a powered down state and operated when the moved signal is received. The determined location is stored, preferably in memory 250, for subsequent access if the positioning system receiver 245 is unable to later determine the location of the device 230. Alternately, a manual switch 240 may be used that issues a move signal to the positioning system receiver to determine the new location of the device 230 that is stored. Thus, when the sensor 235 determines that the portable device 230 requires service, the positioning system receiver, in one embodiment, determines the current location of the device 230. If, for some reason, the receiver is unable to acquire the positioning signals to determine the location of the device 230, then the location stored in memory 250 is sent back to the service base station 260 to indicate that the device 230 requires service. Alternately, the location stored in the memory 250 is always used and the receiver 245 is only activated when the portable device 230 is moved.

Figure 2C:
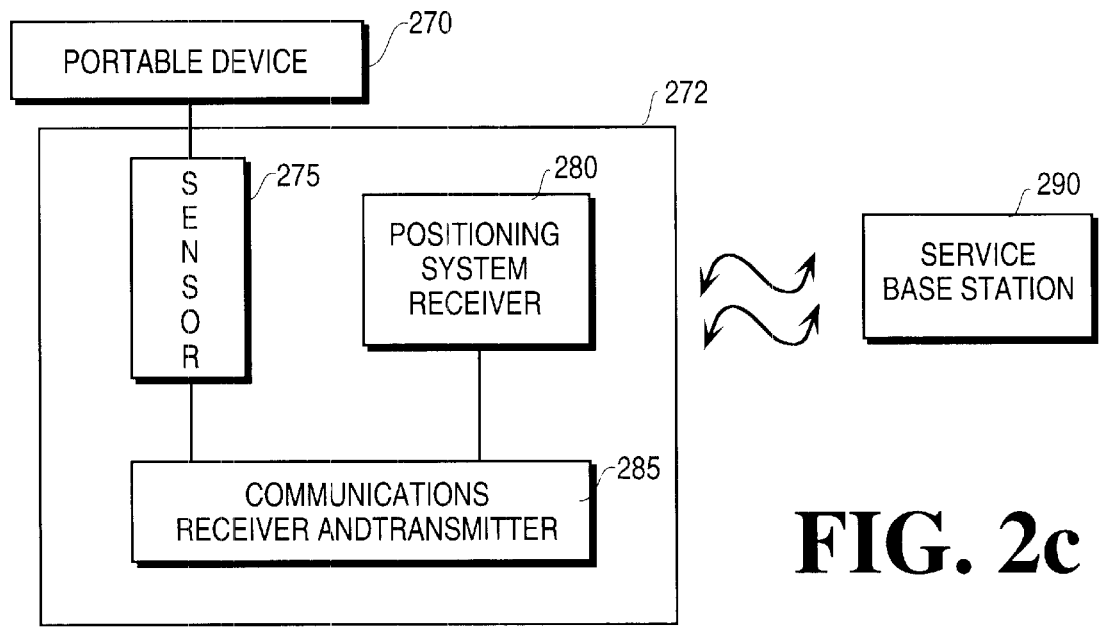

An alternate embodiment is shown in FIG. 2c. In this embodiment, the service base station 290 communicates a query to the device 272. The communications transceiver 285 receives the query and utilizing the sensor 275 and positioning system receiver 280, the status and location of the portable device 270 is determined. The status and location is transmitted back by communications transceiver 285 to the service base service station 290. This can be used to determine the status of a query by the service base station, and also can be used to locate lost devices.

Figure 2D:
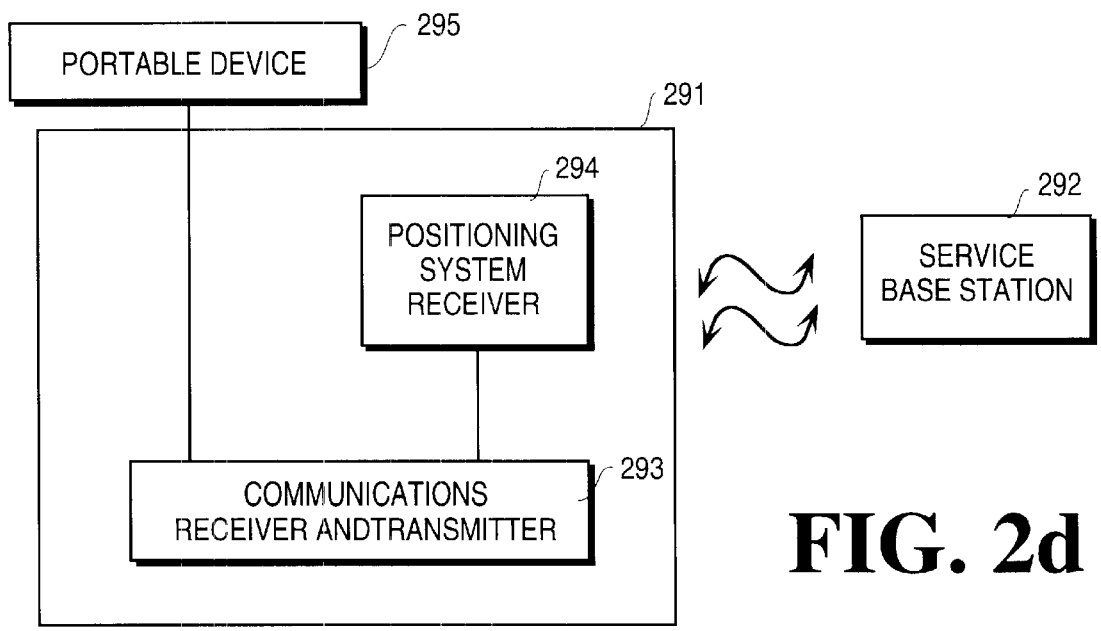

FIG. 2d illustrates one embodiment in which the device 291 is responsive to queries or commands from the service base station 292 and is utilized by the service base station to confirm the location of the portable device 295 and possibly download certain commands or data to the device based upon its location. For example, if the portable device 295 is a road sign, depending upon its location the service base station may download data to cause the road sign to display certain road hazard or safety information.

Figure 3:
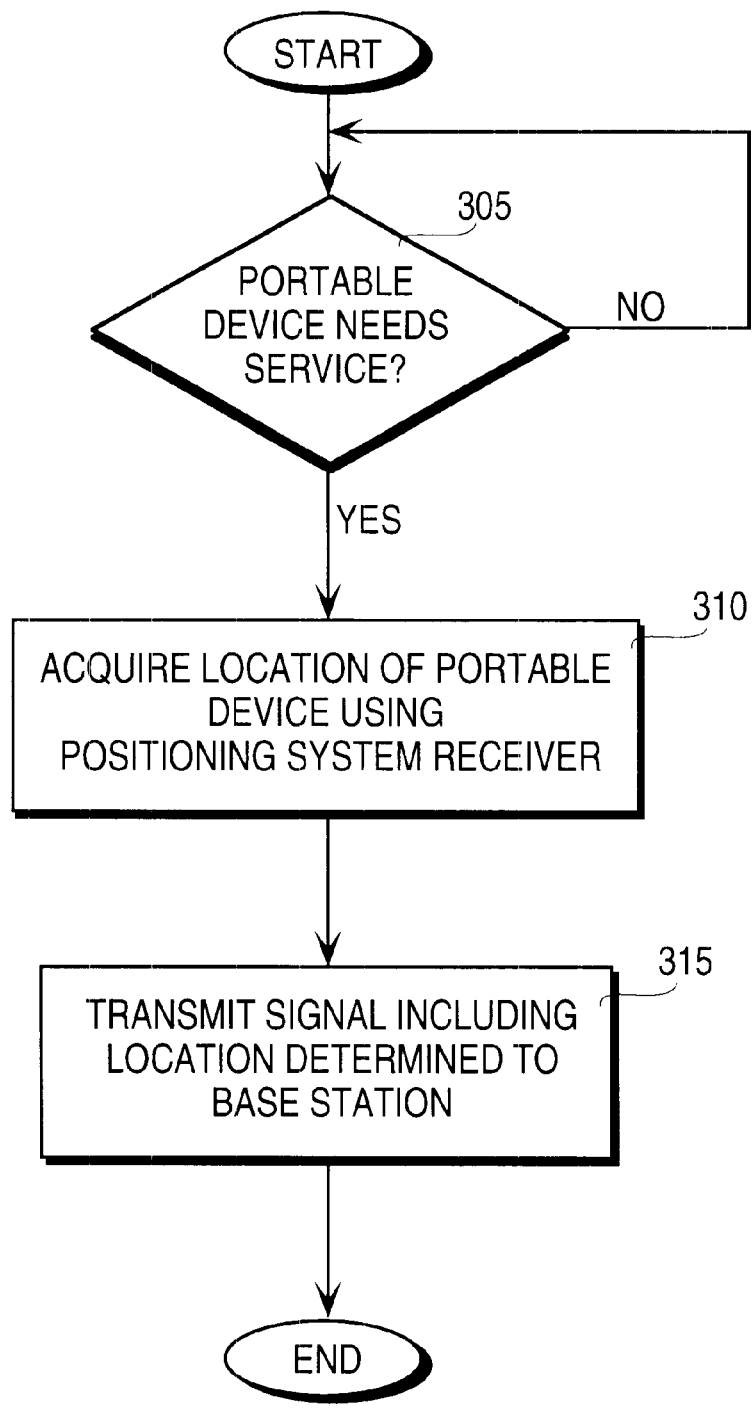
FIG. 3 is a simplified flow chart of one embodiment of the method of the present invention.

One embodiment of the method of the present invention is described with reference to FIG. 3. At step 305 it is determined whether the portable device requires service. If it requires service, at step 310 the location of the portable device is acquired using a positioning system receiver. At step 315, a service signal is sent to the service base station, the signal including the location determined by the positioning system receiver.

Figure 4:
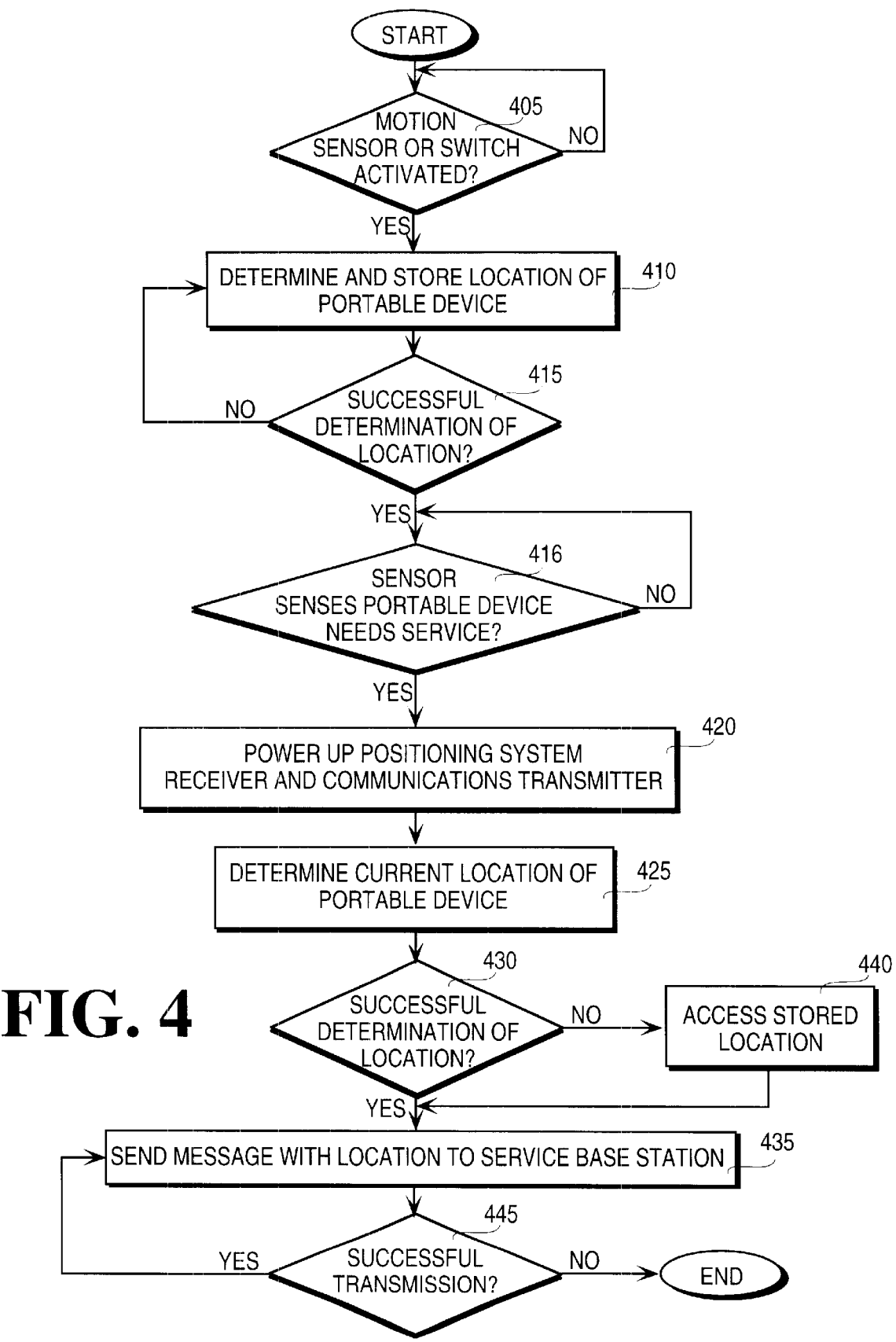
FIG. 4 is a flow chart illustrating an alternate embodiment of the present invention.

An alternate embodiment of the method of the present invention is described with reference to FIG. 4. At step 405, if the motion sensor or switch is activated, at step 410 the positioning system receiver determines the location of the portable device and stores the location determined in memory. At step 415, this process continues until a successful determination of the location occurs. At step 416, if the sensor senses that the portable device requires service, at step 420, the positioning system receiver is powered up for operation. In addition, the communications receiver, which in one embodiment includes a transmitter, is also powered up for operation. At step 425, the current location of the portable device is determined using the positioning system receiver. If there is a successful determination of location, step 430, the transmitter sends a message with the location to the service base station, step 435. Alternately, if the location is not determined, for example, when positioning signals are not available, then the stored location is accessed sent to the servicing base station, steps 430 and 435. At step 445, the process continues until a successful transmission occurs.

Figure 5:
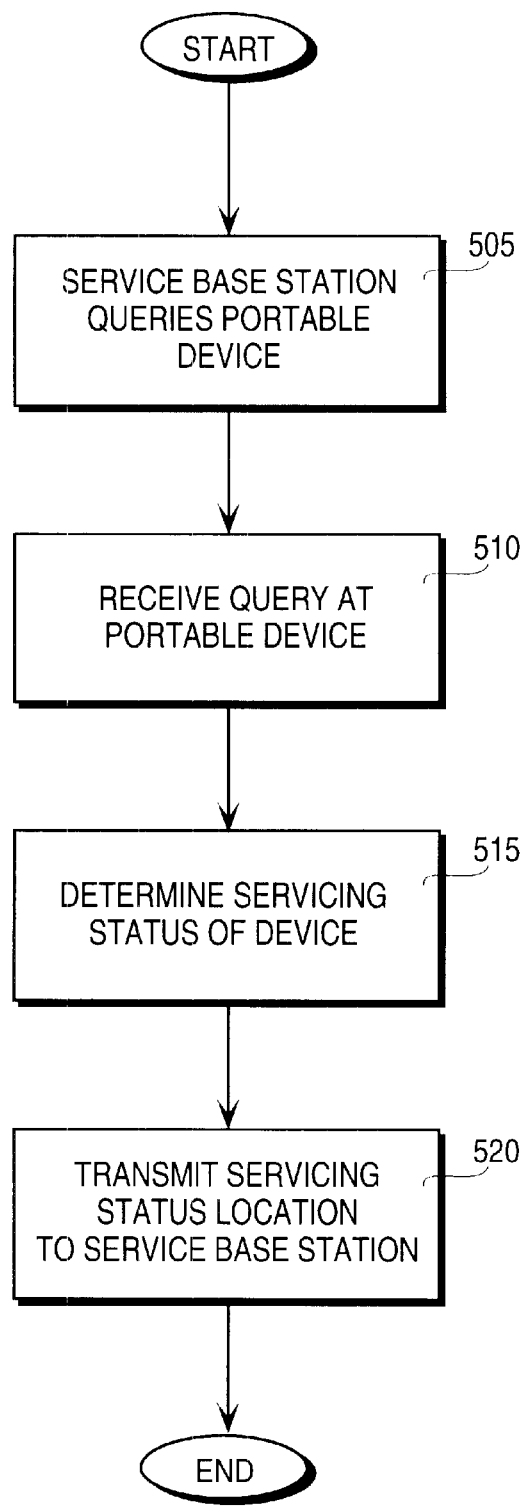
FIG. 5 is a flowchart illustrating an alternate embodiment of the method of the present invention.

It is apparent that a number of alternate embodiments may be used. For example, as shown in FIG. 5, the system may be configured to accept queries from the service base station, enabling the service base station to easily determine the service status of the portable device. Referring to FIG. 5, at step 505 the service base station queries the portable device. Preferably this is done by transmitting a query signal to the system a receiver is located with the portable device. The query is received at the portable device, step 510, and the location and status of the portable devices determined, step 515. A signal is then sent back to the service base station indicating the location of the portable device, and alternately in addition, the status of the portable device, step 520. The status may be as simple as servicing required, or not required, or something more detailed indicating the fullness or amount of use of the portable device, or perhaps the anticipated time at which service is needed based on usage. In addition, such a query apparatus may be simply to transmit the location of the device. This may be used to locate misplace devices or download certain comments or information depending upon the transmitted location of the device.

The invention has been described in conjunction with the preferred embodiment. It is evident that numerous alternatives, modifications, variations and uses will be apparent to those skilled in the art in light of the foregoing description.

What is claimed is:

1. A system comprising:

a base station;

a portable road sign device, the device configured to receive queries from the base station, issue replies to the base station, including the device's location, and receive instructions to perform task or send data from the base station based upon the device's location or device status and that, depending upon the device's location, receives from the base station data to display information selected from the group consisting of road hazard, safety or construction information.

2. A base station for controlling displays of remote construction signs, the displays displaying information selected from the group consisting of road hazard, safety or construction information, comprising a communication device configured to issue queries to displays remote from the base station and receive replies from the displays, including a display's location, said base station further issuing instructions to perform tasks or send data from the base station based upon the display's location.

3. A method comprising:

receiving queries from a base station;

a portable road sign device, remote from the base station, issuing replies to the base station, including the device's location, the device receiving instructions to perform tasks or send data from the base station based upon the device's location or device status and receiving data from the base station to display certain information selected from the group consisting of road hazard, safety or construction information, the information depending upon the device's location.

4. A method for remotely controlling displays of construction signs comprising:

issuing queries to remote displays, the displays displaying information selected from the group consisting of road hazard, safety or construction information;

receiving replies from the displays, including a display's location; and issuing instructions to perform tasks or send data to the display based upon the display's location.

* * * * *